United States Patent Office 2,844,625
Patented July 22, 1958

2,844,625
p-AMINOSALICYLIC ACID

Albert P. Centolella, Elkhart, Ind., assignor to Miles Laboratories, Inc., Elkhart, Ind., a corporation of Indiana No Drawing. Application September 13, 1954
Serial No. 455,781

3 Claims. (Cl. 260—519)

This invention relates to a method of preparing para-aminosalicylic acid and more particularly relates to a process of producing a very pure PAS, as the acid is commonly called. As will be subsequently seen, the PAS produceable by the method of this invention has unique properties unknown in the prior art.

Both para-aminosalicylic acid and the monosodium salt of the acid have pharmaceutical applications in the treatment of various forms of tuberculosis. As in the case of pharmaceutical applications in general, the use of PAS requires that special attention be given to product purity.

Free para-aminosalicylic acid is relatively unstable in aqueous solution and decomposes with the evolution of carbon dioxide to form m-aminophenol. Because of the unstable nature, particularly at temperatures above 40°, the acid cannot be crystallized from a solvent in the usual manner to give a purer form. For this reason, it has been customary to make a solution of an alkaline metal salt of the acid such as sodium para-aminosalicylate which can be treated with activated carbon, the carbon and impurities then being removed by filtration. From the remaining solution, the acid form is precipitated by acidification with a strong acid such as hydrochloric, sulfuric or formic acid.

By the customary process described above, a light, amorphous para-aminosalicylic acid is obtained which has a density on the order of 80 to 120 ml./oz. This is obviously a very light powder which is also known to produce a great deal of undesirable foam when used with sodium bicarbonate to make solutions of the sodium salt.

Accordingly, the aim of this invention is the production of a very dense PAS crystal and a form of crystal having little or no propensity toward foam formation when employed in making solutions of the sodium salt. These objects have become attainable upon the discovery that when an alkali metal salt of PAS is dissolved in water and isopropanol introduced before or during the addition of strong acids bringing the pH of the solution in the approximate range of 3.0 to 3.4, a dense, pure crystalline PAS results. Likewise, with the inclusion of a surface active agent the same result can be obtained with the need for less isopropanol.

The following examples are illustrative of the operation comprehended by my invention of producing a dense crystalline PAS.

Example I 196 grams of commercial sodium para-aminosalicylate (18.5% $H_2O$) was dissolved in 196 ml. of water and 150 ml. of isopropanol. 6 grams of sodium bisulfite was dissolved in the solution and the solution filtered. While stirring and keeping the temperature between 25–31° C., seven grams of 85% formic acid and 27.5 g. of 95% sulfuric acid in 150 ml. of water was added during 1½ hours. The mixture was stripped 1 hour longer, cooled to 23° and filtered. The filter cake was washed with 100 cc. of water, further washed with 100 cc. of 25% isopropanol and 100 cc. of water, and vacuum dried to constant weight at 45–50° C. Weight of p-aminosalicylic acid was 76.5 g. (92.7% yield) exhibiting a density of 47 cc./oz.

Example II 138 grams of sodium para-aminosalicylate was dissolved in 250 cc. of distilled water and approximately 2 g. of "Norit" (highly-adsorptive activated carbon sold by American Norit Co.) was added, heated to 45° C., with stirring for 15 minutes and filtered. 150 ml. of isopropanol and 10 ml. of a 1% Aerosol OT solution were added. After 2 gm. of sodium hydrosulfite had been added and while stirring and keeping the solution at room temperature six ml. of 85% formic acid was added slowly followed by 200 ml. of 16% sulfuric acid. The precipitate was filtered and reslurried in water (to remove sulfates) washed again with water and vacuum dried at 45–50°, yield 93 grams (93%) of p-aminosalicylic acid, exhibiting a density of 49 cc./oz.

Example III 138 grams of the dihydrate crystalline monosodium salt of p-aminosalicylic acid was dissolved in 250 ml. of distilled water, heated to 45° C., and stirred 15 minutes with 1 gram of carbon and filtered; 50 ml. of isopropanol and 0.5 grams of Aerosol OT (solid) was added. 95 ml. of 85% formic acid was slowly added while stirring and keeping the temperature at 20–30° C. The para-aminosalicylic acid was filtered, washed with distilled water and vacuum dried at 45–50° C., the yield was 86 gms. (86%), having a density of 35 cc./oz.

Example IV 138 grams of the dihydrate crystalline monosodium salt of p-aminosalicylic acid was dissolved in 250 ml. of distilled water. 1 gram of carbon was added and the mixture heated to 45° with agitation; kept there 15 minutes and filtered free of carbon. Two grams of sodium hydrosulfite, 0.6 grams of an 80% solution of Aerosol MA (dihexyl sodium sulfosuccinate) and 50 cc. of isopropanol was added. The above solution cooled to 25° and 50 ml. of 90% formic acid slowly added while agitating. After cooling to 20°, the precipitate was filtered and washed well with water. After vacuum drying, the yield was 93.3 grams of crystalline p-aminosalicylic acid, having a density of 39 cc./oz.

Example V 138 grams of the dihydrate crystalline monosodium salt of p-aminosalicylic acid was dissolved in 250 ml. of distilled water. 1 gram of carbon added and the mixture heated to 45° with agitation; kept there 15 minutes and filtered free of carbon. Two grams of sodium hydrosulfite, 0.7 gram of isopropyl naphthalene sodium sulfonate (Aerosol AS, 75% solution) and 50 cc. of isopropanol was added. The solution was cooled to 25° with agitation and 50 ml. of 90% formic acid added slowly. Agitation was continued 1 hour longer and mixture cooled to 20° C. The precipitate was filtered, washed well with water, and vacuum dried. The yield of pure p-aminosalicylic acid was 94.6 grams, having a density of 42 cc./oz.

Example VI 827 lbs. of the dihydrate crystalline monosodium salt of p-aminosalicylic acid was dissolved in 1439 lbs., of distilled water. 30 lbs. of Nuchar and 30 lbs. of sodium bisulfite were added and the mixture agitated 2 hours. The mixture was filtered free of carbon and 858 lbs. of isopropanol added. While agitating 51 lbs. of 90% formic acid was slowly added. A cold dilute solution of sulfuric acid (200 lbs. of C. P. 95% $H_2SO_4$ plus 1090 lbs. of water) was added slowly with agitation, keeping the mixture between 20-25° C.

After the sulfuric acid had been added the mixture was agitated 1 hour, centrifuged and washed well with water. The solid was vacuum dried at 50° for 24 hours. The yield of pure p-aminosalicylic acid was 553 lbs. with a density of 50 cc./oz.

Having thus described a form of para-aminosalicylic acid having novel physical properties and a method of producing the acid, what is claimed is:

1. The process of producing a pure, dense form of p-aminosalicylic acid which comprises dissolving an alkali metal salt of said acid in a water-isopropanol medium and acidifying the solution thus formed to precipitate a dense p-aminosalicylic acid.

2. The process of producing a pure, dense form of p-aminosalicylic acid which comprises dissolving an alkali metal salt of said acid in an aqueous medium containing isopropanol and a surface active agent and acidifying the solution thus formed to precipitate a dense crystalline p-aminosalicylic acid.

3. The process according to claim 2 in which the surface active agent is bis(2-ethylhexyl) sodium sulfosuccinate.

References Cited in the file of this patent

UNITED STATES PATENTS

| | | |
|---|---|---|
| 2,552,486 | Hulquist | May 8, 1951 |
| 2,658,073 | Terpstra | Nov. 3, 1953 |

FOREIGN PATENTS

| | | |
|---|---|---|
| 1,029,988 | France | Mar. 11, 1953 |

OTHER REFERENCES

Sheehan: JACS, 1948, vol. 70, p. 1665.